United States Patent [19]

Smith et al.

[11] 3,944,249

[45] Mar. 16, 1976

[54] INFLATING DEVICE FOR USE WITH VEHICLE SAFETY SYSTEMS

[75] Inventors: Lester E. Smith, Herrin; Dean R. Kilbourn, Marion, both of Ill.

[73] Assignee: Olin Corporation, New Haven, Conn.

[22] Filed: Sept. 5, 1972

[21] Appl. No.: 286,481

[52] U.S. Cl. ............... 280/150 AB; 102/37.7; 141/4
[51] Int. Cl.² ........................................... B60R 21/08
[58] Field of Search ....... 280/150 AB; 102/37.7, 39; 23/281; 141/4

[56] References Cited
UNITED STATES PATENTS

| 3,154,168 | 10/1964 | Wilmot | 180/103 |
|---|---|---|---|
| 3,582,107 | 6/1971 | Goetz | 280/150 AB |
| 3,649,045 | 3/1972 | Smith | 280/150 AB |
| 3,663,036 | 5/1972 | Johnson | 222/5 |
| 3,674,059 | 7/1972 | Stephenson | 280/150 AB |
| 3,711,115 | 1/1973 | Lohr | 280/150 AB |
| 3,713,667 | 1/1973 | Blanchard | 280/150 AB |
| 3,758,131 | 9/1973 | Stephenson | 280/150 AB |

*Primary Examiner*—M. H. Wood, Jr.
*Assistant Examiner*—John P. Silverstrim
*Attorney, Agent, or Firm*—Donald R. Motsko; William W. Jones

[57] ABSTRACT

An apparatus for use in connection with vehicle safety systems of the type including an inflatable confinement which is inflated by the combined energy of a stored fluid under pressure and gas generated by the burning of a propellant. Two distinct propellant charges are provided which are sequentially ignited. The outlet from the reservoir storing the fluid under pressure is opened in response to the ignition of the first propellant charge. The sequential ignition of the propellant charges reduces the peak pressure in the reservoir.

5 Claims, 5 Drawing Figures

INFLATING DEVICE FOR USE WITH VEHICLE SAFETY SYSTEMS

BACKGROUND OF THE INVENTION

The present invention relates generally to the field of vehicle safety systems of the type utilizing an inflatable confinement. More particularly, this invention relates to an improved inflating systems for inflating the confinements of such safety devices.

A great deal of attempt is being given to the problem of increasing the safety of passenger vehicles. As well as trying to increase the safety of the vehicle itself, considerable effort is being given to the development of passive restraint systems which will protect the occupants of a vehicle from injury due to impact without the necessity of the occupant taking any positive action.

One type of passive restraint system which has been developed utilizes an inflatable confinement means such as a bag which is automatically inflated in response to a predetermined condition such as impact or upsetting of the vehicle to prevent the occupant from contacting the interior of the vehicle.

Some vehicle safety systems of the type employing inflatable confinements utilize an inflatable confinement means, a stored fluid under pressure in a chamber, and a propellant charge for the generation of hot gas. When a collision of the vehicle is sensed, the propellant charge is ignited and the hot gas resulting therefrom caused to mix with the stored fluid, and the mixture released to inflate the confinement. When the propellant gas is caused to discharge into the fluid storage chamber, some propellants have been found to be so fast burning that even though the fluid chamber outlet is opened at substantially the same time as the propellant gas begins to flow into the fluid storage chamber, a substantial increase in pressure over that of the fluid storage pressure is experienced in the chamber. This could result in the rupturing of the storage chamber with a subsequent failure of the safety system as well as possible injury to the occupants over and above that caused by the accident itself. Attempts to increase the strength of the chamber to withstand the sudden surge of pressure results in increased cost and additional manufacturing complexity.

SUMMARY OF THE INVENTION

The present invention has for one of its objects an improved apparatus for use in a vehicle safety system of the type which utilizes the combined energy of a propellant charge and stored fluid under pressure to inflate an inflatable confinement.

A further object of the present invention is the provision of an improved apparatus for use in connection with safety systems of the type utilizing the energy of a fluid under pressure in a container and a propellant charge to inflate the confinement wherein the surge in pressure in the container upon ignition of the propellant charge is reduced.

These and other objects and advantages of the present invention may be accomplished generally speaking through the provision of storage means for storing a fluid under pressure. Propellant storage means may be provided for storing at least two distinct propellant charges in separate propellant chambers which are placed in communication with the storage means at least after the ignition of its respective propellant charge. Means are provided to ignite the propellant charges in sequence with the outlet from the reservoir being open upon or after the ignition of the first ignited propellant charge but before the second propellant charge is contributing high pressure gas to the storage means.

DETAILED DESCRIPTION

Figure 1:
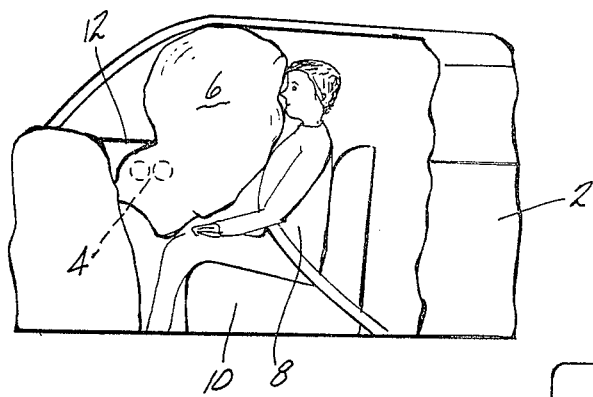
FIG. 1 is a partially broken away, fragmentary, side view of a vehicle equipped with a device incorporating the present invention and showing the inflatable confinement in its inflated position.

Referring to the drawings, and particularly to FIG. 1, a vehicle 2 is shown provided with a safety assembly including generally an inflating system 4 and an inflatable confinement 6 such as a bag or the like. An occupant 8 is shown seated in the front seat 10 of the vehicle 2. The safety assembly is shown mounted in the dashboard 12 of the vehicle 2. The bag 6 is normally stored in the collapsed condition. In the event of impact of the vehicle 2 due to a crash, the inflating system 4 will be actuated to inflate the bag 6 into a position such as shown in FIG. 1 to prevent the occupant from coming into contact with the interior of the vehicle 2. It is to be understood that the safety device incorporating the present invention may be placed in other locations in the vehicle. For example, the device may be placed on the inside of the roof of the vehicle, on the steering wheel, or in the back of the front seat to protect those occupants seated in the rear of the vehicle.

The inflating system 4 includes a pressure source 14 which is connected to the inflatable confinement 6 which is normally stored in a collapsed condition. The pressure source 14 may include a housing 16 having a chamber 18 therein. The housing 16 is provided with a threaded outlet 20 to which is attached a tank 22, the interior of which together with the chamber 18 provides a fluid storage reservoir for storing fluid, such as air, nitrogen, or mixtures thereof under pressure. The housing 16 also includes a fluid outlet 24 which is spaced across the chamber 18 from and in alignment with a threaded propellant inlet 26. The walls of chamber 18 normally closes the outlet 24 and propellant inlet 26. However, the walls of the chamber 18 are provided with circular grooves 28 and 30 to provide rupturable closure portions 32 and 34 which close the outlet 24 and propellant inlet 26 respectively.

Figure 2:
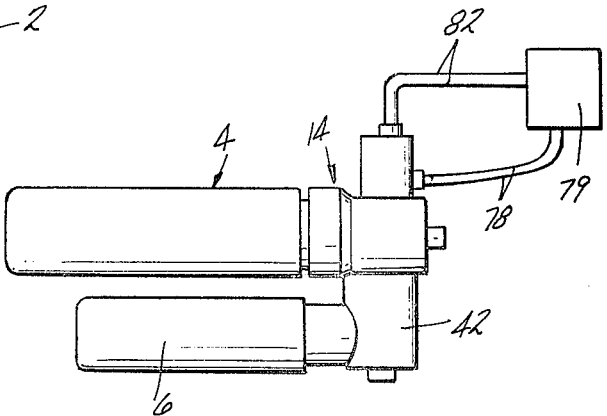
FIG. 2 is a schematic representation of a safety system for a vehicle incorporating the present invention.
Figure 3:
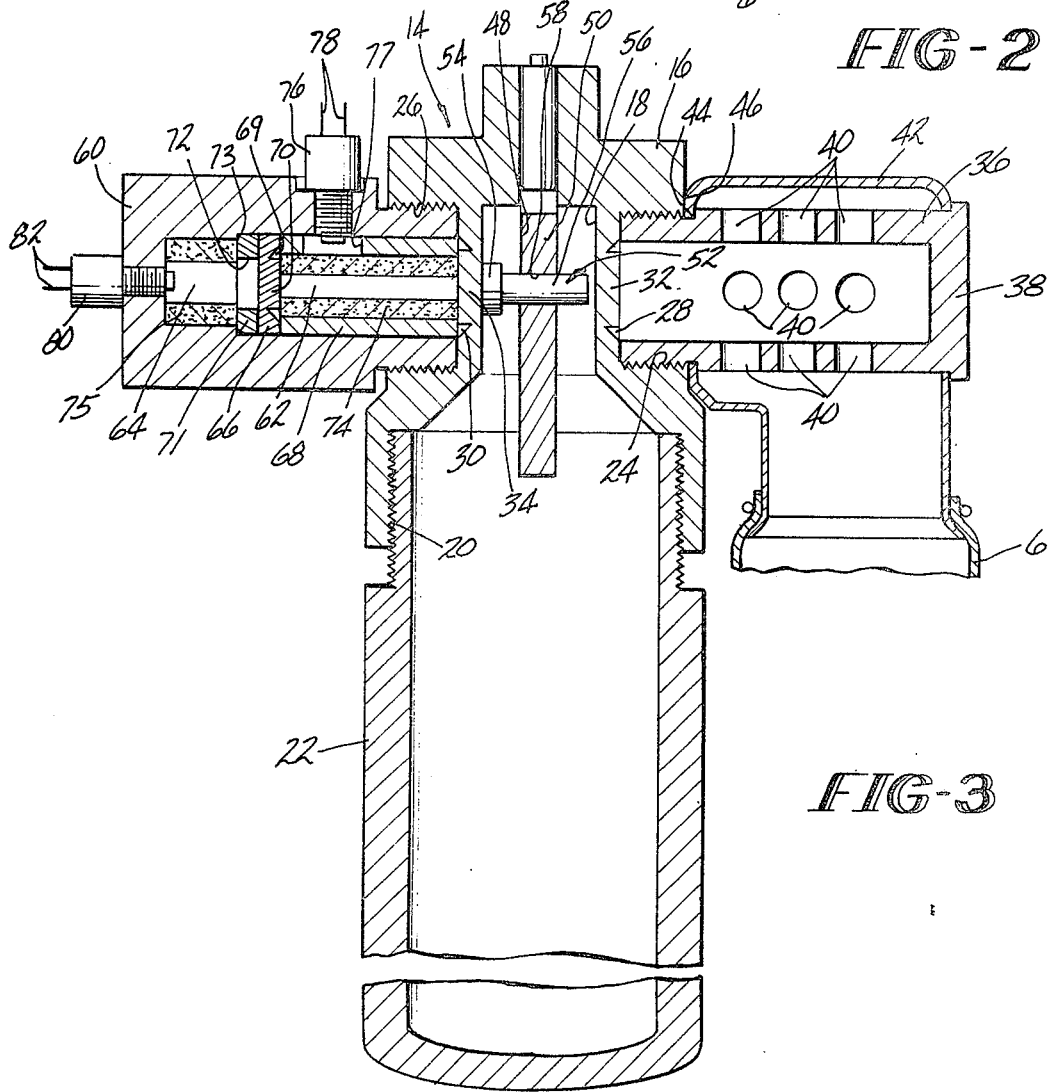
FIG. 3 is a cross-sectional view of the inflating unit incorporating the present invention.

A diffuser member 36 may be threadedly secured to the outlet 26 of the housing member 16. The diffuser member 26 may be of a generally cylindrical shape having a closed outer end 38 with the side wall thereof provided with a plurality of apertures 40. A manifold 42 surrounds the side wall of the diffuser member 36 and is held in position by virtue of a shoulder 44 on the diffuser member 36 clamping it to the wall 46 of the housing 16. The inflatable confinement 6 is attached to the manifold 42 by any suitable means.

amber 18 of the housing member 16 includes 48 which extends around the chamber from a jacent to threaded inlet 20. The midplane of ve 48 is perpendicular to the axis of the fluid l and propellant inlet 26. A baffle member 50 positioned within the groove and substantially es the chamber 18 into two separate sections. member 52 extends from the rupturable clotion 34 to a point slightly spaced from the le closure portion 32. The enlarged head porof the rod member 52 may be placed in contact turable closure portion 34 with the reduced 56 extending through an aperture 58 in the ate 50 and terminating at a point spaced from urable closure portion 32.

pellant storage member 60 is threadedly ato the threaded propellant inlet 26 in the housThe propellant storage member 60 includes a propellant chamber 62 which is separated secondary propellant chamber 64 by a burst m 66. The burst diaphragm 66 is held in place e of a sleeve member 68 extending in the priopellant chamber 64 between the rupturable portion 34 and the burst diaphragm 66. The phragm is provided with a circular groove 69 which forms a rupturable closure portion 70. A ember 71 having a central aperture 72 therein oned on the opposite side of the burst dia- 66 and is engaged by a shoulder 73 in the protorage member 60.

he primary propellant chamber 62 and secondellant chamber 64 contain a suitable propelrge 74 and 75 respectively, capable of generatt non-toxic gas when ignited. Nitrocellulose nokeless powder with or without various modiy be used. The propellant charges 74 and 75 n the form of loose powder, a solid gas generatidge, or a plurality of large grains.

table ignitor 76 such as a squib member l within an appropriate housing is threadedly to the side wall of the propellant storage memnd communicates with the primary propellant 62 through an aperture 77 in the sleeve memo that the ignitor 76 will ignite the propellant e primary propellant chamber 62 when it is itable lead wires 78 connect the squib member a suitable electric circuit and sensor indicated ically by member 79 in FIG. 2. A second ignihich also may be a squib member in a suitable is attached to the end wall of the propellant ember 60 in a position to communicate with te the propellant charge 75 in the secondary nt chamber 64. Suitable leads 82 connect the 0 with the suitable electric circuit and sensor rangement is such that the ignitors 76 and 82 ned to fire sequentially so that the propellant primary propellant chamber 62 is first ignited ignition of the propellant 75 in the secondary nt chamber is delayed for a short interval of is delay is preferably in the order of 5 15 15 nds.

the device is actuated in response to a predel condition of the vehicle such as a crash, ignirill ignite the propellant charge 74 in the pripellant chamber 62 which will burn and gen: gas under pressure, which, at a predetermined , will cause the rupture of rupturable closure portion 34 and open the propellant inlet 26 to the chamber 18 in the housing 16. As soon as the rupturable closure portion 34 is ruptured, rod member 52 is driven toward rupturable closure portion 32 and impacts thereon to cause the rupturing of rupturable closure portion 32 and thereby open the fluid outlet 24 in housing 16. The hot gas generated from the burning of the propellant 74 in the primary propellant chamber 62 flows into chamber 18 and is deflected by baffle member 50 into the fluid reservoir, and mixes with the fluid contained therein, with the combined hot gas and stored fluid exiting through fluid outlet 24.

A short time after, preferably in the range of 5 to 15 milliseconds, ignitor 80 will ignite the propellant charge 74 in the secondary propellant chamber 64. The burning of propellant charge 74 will generate gas under pressure which at a predetermined point will rupture the rupturable closure portion 70 of burst diaphragm 66 and flow through the primary propellant chamber 66 and inlet 26 into the chamber 18 wherein it will also be deflected into the fluid reservoir and mix with the fluid therein and exit through outlet 24.

The combined stored fluid and propellant generated gas will pass through the apertures 40 in the diffuser member 36 through manifold 42 to the bag 6 to cause the inflation thereof.

Figure 4:
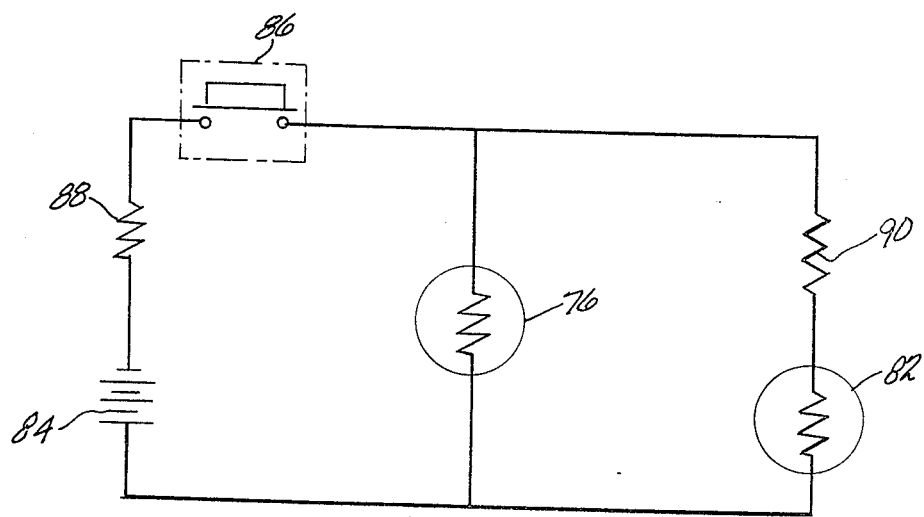
FIG. 4 is a schematic representation of the firing circuit used in connection with the present invention.

One method of obtaining the sequential igniting of the two propellant charges is by firing the two ignitors 76 and 82 in sequence. One method accomplishing this is to connect the ignitors 76 and 82 in parallel in an electric circuit with a resistance being placed in series with one of the ignitors. Such a circuit is shown in FIG. 4 wherein the ignitors 76 and 82 are shown connected in parallel to a voltage source 84 which may be the battery of the vehicle. The numeral 86 represents a suitable sensor designed to sense when the vehicle is involved in an accident. Such a sensing device may be an accelerometer or inertia responsive switch. For means of explain the particular circuit, reference numeral 88 designates the circuit resistance. Resistance 90 designates the resistance placed in series with the ignitor 82 to provide the desired delayed time.

Figure 5:
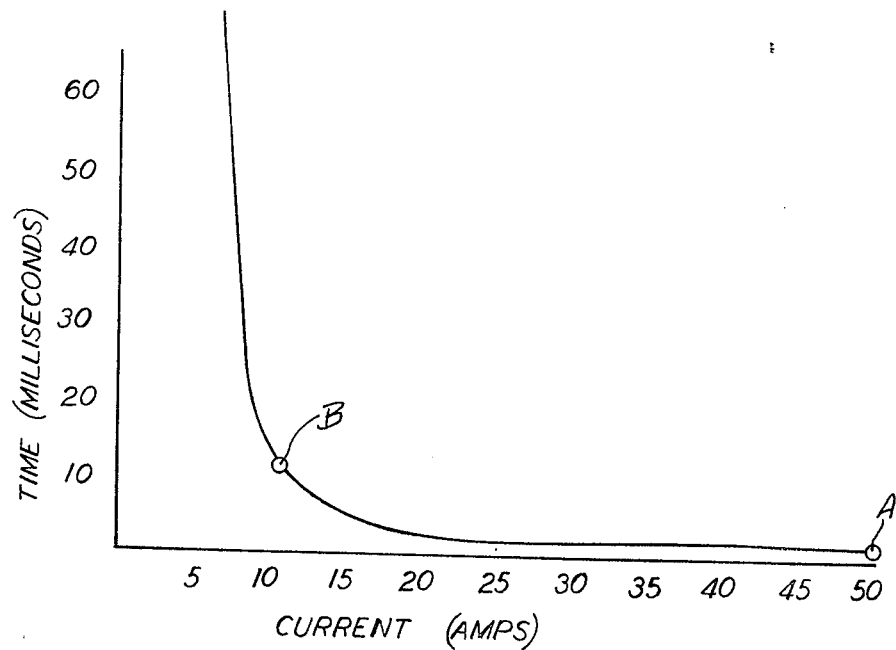
FIG. 5 is a graph of time verses current for one specific example of the firing circuit of FIG. 4.

In one particular example, the voltage source 84 was a 12 volt direct current battery with the circuit resistance 90 being ascertained at 0.15 ohms. Both of the ignitors 76 and 82 were identical squibs and rated at 0.5 ohms. Resistance 90 was 0.80 ohms. Upon actuation of the circuit, squib 76 was fired in 1.6 milliseconds with the current being 50 amps. This point is shown as point A of the curve of FIG. 5. Squib 76 was fired at point B on the curve of FIG. 5 at 11.6 milliseconds with the current being 11.5 amps.

While in the above example, the sequential firing of the squibs was provided by placing a resistance in series with one of the ignitors, while the ignitors were in turn connected in parallel with the sensor, it is to be understood that other means of sequentially firing the ignitors may be employed. For example, either an ignitor having a different delay time than the first ignitor could be used, also, a second ignitor with a different bridge wire may be used to provide the desired delay.

With the present invention, the outlet of the fluid storage reservoir is opened in response to the ignition of the first propellant charge. By delaying the ignition of the second propellant charge a predetermined time, the peak pressure in the fluid storage reservoir is reduced.

What is claimed is:

1. An apparatus for use with a safety system of the type utilizing an inflatable member, a stored fluid under pressure, and a propellant charge for generating a hot gas, said apparatus comprising storage means for storing a fluid under pressure and including an outlet adapted to be attached to the inflatable member; means closing said outlet against fluid flow; propellant storage means including at least two propellant storage chambers for storing an ignitable propellant; a propellant charge in each of said propellant chambers; means sealing each of said propellant chambers from the interior of said storage means and operable upon development of a predetermined chamber pressure to unseal said chambers; condition responsive means for igniting all of said propellant charges sequentially; means operable upon the unsealing of the propellant chamber housing of the first ignited propellant charge and before the other propellant chamber is unsealed to disable said means closing said outlet to permit fluid and hot gas to flow through said outlet, said propellant storage means including an axially extending housing attached to said storage means; means in said housing dividing the interior thereof into a primary propellant chamber adjacent one end and a secondary propellant chamber adjacent the other end, means at said one end for sealing said primary chamber from the interior of said storage means and operable upon the development of a predetermined pressure in said primary chamber after ignition of the propellant charge therein to unseal said chamber, said means in said housing dividing the interior thereof including means operable upon development of a predetermined pressure in said secondary chamber after ignition of said propellant charge to provide communication between said secondary and said primary propellant chambers, said means for igniting said propellant charges in sequence igniting the propellant charge in said primary propellant chamber before igniting the propellant charge in said secondary propellant chamber.

2. The apparatus of claim 1 wherein the delay between the ignition of the propellant charge in the primary propellant chamber and the ignition of the propellant charge in the secondary propellant chamber is between 5 and 15 milliseconds.

3. The apparatus of claim 1 wherein said means for igniting said propellant charges sequentially including a first ignitor communicating with the propellant charge in said primary propellant chamber, a second ignitor communicating with the propellant charge in the secondary propellant chamber, and means for firing said first ignitor before said second ignitor.

4. The apparatus of claim 3 wherein said ignitors are squib members, and further including electrical circuit means for connecting said squib members in parallel, said electrical circuit means including a resistance in series with the squib member associated with the propellant charge in the secondary propellant chamber.

5. The apparatus of claim 4 wherein the delay between the firing of said squib member associated with the propellant charge in the primary propellant chamber and the firing of said squib member associated with the propellant charge in the secondary propellant chamber is from 5 to 15 milliseconds when the system is actuated.

* * * * *

UNITED STATES PATENT OFFICE
CERTIFICATE OF CORRECTION

Patent No. 3,944,249  Dated March 16, 1976

Inventor(s) Lester E. Smith & Dean R. Kilbourn

It is certified that error appears in the above-identified patent and that said Letters Patent are hereby corrected as shown below:

Col. 3, line 61, please delete "5 15 15" and insert --5 to 15--

Signed and Sealed this eighth Day of June 1976

[SEAL]

Attest:

RUTH C. MASON
Attesting Officer

C. MARSHALL DANN
Commissioner of Patents and Trademarks